US012263808B2

(12) United States Patent
Kirchmair et al.

(10) Patent No.: US 12,263,808 B2
(45) Date of Patent: Apr. 1, 2025

(54) TRACKED VEHICLE AND FLEET OF TRACKED VEHICLES (71) Applicant: PRINOTH S.P.A., Vipiteno (IT)

(72) Inventors: Martin Kirchmair, Pfons (AT); Richard Casartelli, Pfitsch (IT)

(73) Assignee: PRINOTH S.P.A., Vipiteno (IT)

( * ) Notice: Subject to any disclaimer, the term of this patent is extended or adjusted under 35 U.S.C. 154(b) by 513 days.

(21) Appl. No.: 16/475,605

(22) PCT Filed: Jan. 25, 2018

(86) PCT No.: PCT/IB2018/050460
§ 371 (c)(1),
(2) Date: Jul. 2, 2019

(87) PCT Pub. No.: WO2018/138671
PCT Pub. Date: Aug. 2, 2018

(65) Prior Publication Data
US 2019/0375370 A1 Dec. 12, 2019

(30) Foreign Application Priority Data

Jan. 25, 2017 (IT) .................. 102017000007911

(51) Int. Cl.
*B60R 25/04* (2013.01)
*B60K 20/02* (2006.01)
(Continued)

(52) U.S. Cl.
CPC .............. *B60R 25/04* (2013.01); *B60K 20/02* (2013.01); *B60K 26/02* (2013.01); *B60K 35/00* (2013.01);
(Continued)

(58) Field of Classification Search
None
See application file for complete search history.

(56) References Cited

U.S. PATENT DOCUMENTS 5,426,703 A * 6/1995 Hamabe ........... G10K 11/17817
381/86
5,692,052 A * 11/1997 Tanaka ............. G10K 11/17873
381/71.9
(Continued)

FOREIGN PATENT DOCUMENTS

| CN | 101118662 A | 2/2008 |
|---|---|---|
| EP | 1980441 | 10/2008 |

(Continued)

OTHER PUBLICATIONS

Office Action and Search Report for Russian Application No. 2019126466/11 dated Mar. 10, 2021.
(Continued)

*Primary Examiner* — Muhammad Adnan
(74) *Attorney, Agent, or Firm* — Neal, Gerber & Eisenberg, LLP (57) ABSTRACT

A tracked vehicle comprising a first and a second track, a mechanical power generator assembly; an assembly of operating devices coupled to the generator assembly; a first and a second drive wheel coupled respectively to the first and to the second track, and to the generator assembly; a user interface to receive inputs from an operator; and a control unit coupled to the user interface to receive inputs; the control unit being coupled to the mechanical power generator assembly and being configured to enable or disable starting of the mechanical power generator assembly.

21 Claims, 4 Drawing Sheets

(51) Int. Cl.
*B60K 26/02* (2006.01)
*B60K 35/00* (2024.01)
*B60K 35/10* (2024.01)
*B60R 25/24* (2013.01)
*B60R 25/25* (2013.01)
*B62D 33/06* (2006.01)
*B62D 55/00* (2006.01)
*B62D 55/06* (2006.01)
*E01H 4/02* (2006.01)
*G07C 5/00* (2006.01)
*G07C 5/08* (2006.01)
*B62D 55/28* (2006.01)

(52) U.S. Cl.
CPC ............ *B60R 25/24* (2013.01); *B60R 25/252* (2013.01); *B62D 33/0617* (2013.01); *B62D 55/00* (2013.01); *B62D 55/06* (2013.01); *E01H 4/02* (2013.01); *G07C 5/008* (2013.01); *G07C 5/085* (2013.01); *B60K 35/10* (2024.01); *B60K 2360/1438* (2024.01); *B60Y 2200/25* (2013.01); *B62D 55/286* (2013.01)

(56) References Cited

U.S. PATENT DOCUMENTS

| | | | | |
|---|---|---|---|---|
| 5,815,826 | A * | 9/1998 | Henderson | E02F 9/2025 701/50 |
| 6,249,727 | B1 * | 6/2001 | Muller | G05B 15/02 701/50 |
| 6,381,502 | B1 * | 4/2002 | Rudder | G05B 19/4185 710/110 |
| 7,272,456 | B2 * | 9/2007 | Farchmin | G05B 19/122 700/17 |
| 7,298,275 | B2 * | 11/2007 | Brandt | G05B 19/4183 701/79 |
| 7,437,212 | B2 * | 10/2008 | Farchmin | G05B 19/4188 709/229 |
| 7,650,509 | B1 * | 1/2010 | Dunning | G06F 21/35 713/168 |
| 8,045,723 | B2 * | 10/2011 | Kobayashi | A63G 31/16 381/86 |
| 8,660,738 | B2 * | 2/2014 | Faivre | E02F 9/26 701/124 |
| 8,669,845 | B1 * | 3/2014 | Chakraborty | G06K 7/10425 235/440 |
| 8,885,845 | B2 * | 11/2014 | Honji | G10K 15/04 381/86 |
| 8,994,494 | B2 * | 3/2015 | Koenig | B62M 27/02 307/10.6 |
| 9,947,147 | B1 * | 4/2018 | Kwak | H04L 67/12 |
| 10,074,358 | B1 * | 9/2018 | Valeri | F02M 35/1294 |
| 2004/0030919 | A1 | 2/2004 | Moriya et al. | |
| 2005/0005167 | A1 * | 1/2005 | Kelly | H04L 41/28 726/4 |
| 2005/0104745 | A1 * | 5/2005 | Bachelder | G08G 1/01 340/988 |
| 2005/0113988 | A1 * | 5/2005 | Nasr | B60L 15/06 701/2 |
| 2005/0246040 | A1 * | 11/2005 | Horkavi | G05B 19/0426 700/83 |
| 2006/0152348 | A1 * | 7/2006 | Ohtaki | B60R 25/24 340/426.1 |
| 2006/0170532 | A1 * | 8/2006 | Huntzicker | G07C 9/00182 340/5.64 |
| 2006/0215846 | A1 * | 9/2006 | Kobayashi | G10K 15/02 381/86 |
| 2007/0250920 | A1 * | 10/2007 | Lindsay | G06F 21/31 726/7 |
| 2008/0300010 | A1 * | 12/2008 | Border | H04N 5/23254 348/E5.046 |
| 2009/0027056 | A1 * | 1/2009 | Huang | G01R 31/392 320/132 |
| 2009/0182460 | A1 * | 7/2009 | O'Neal | B60R 25/00 701/2 |
| 2010/0090797 | A1 * | 4/2010 | Koenig | B60R 25/302 340/5.22 |
| 2010/0260012 | A1 * | 10/2010 | Weiner | G10K 15/043 367/137 |
| 2011/0297462 | A1 | 12/2011 | Grajkowski et al. | |
| 2012/0101611 | A1 * | 4/2012 | Inoue | G10K 15/02 700/94 |
| 2013/0073605 | A1 * | 3/2013 | Fosburgh | G06F 11/3013 709/201 |
| 2013/0321178 | A1 * | 12/2013 | Jameel | H04W 4/40 340/989 |
| 2014/0315164 | A1 * | 10/2014 | Jones | G09B 19/16 434/219 |
| 2015/0116132 | A1 | 4/2015 | Nohra et al. | |
| 2016/0304051 | A1 | 10/2016 | Archer et al. | |
| 2016/0318423 | A1 * | 11/2016 | Thibault | B62D 33/0617 |
| 2017/0050617 | A1 * | 2/2017 | Penilla | G06Q 30/0643 |
| 2017/0072908 | A1 * | 3/2017 | Liubakka | G07C 9/0069 |
| 2018/0190040 | A1 * | 7/2018 | Batten | G06Q 20/405 |
| 2019/0003403 | A1 * | 1/2019 | Hedlund | F02D 41/0002 |
| 2019/0111840 | A1 * | 4/2019 | Kang | B60Q 5/008 |
| 2019/0305741 | A1 * | 10/2019 | Yoneda | H03G 3/3005 |
| 2020/0130771 | A1 * | 4/2020 | Jacobsz Rosier | B62J 45/20 |
| 2023/0366160 | A1 * | 11/2023 | Kirchmair | G01N 33/18 |

FOREIGN PATENT DOCUMENTS

| | | | |
|---|---|---|---|
| KR | 20050010446 A | 1/2005 | |
| RU | 2509668 | 3/2014 | |
| RU | 2524809 | 8/2014 | |
| RU | 2560222 | 8/2015 | |
| WO | WO-2015087181 A1 * | 6/2015 | ............... E01H 4/02 |

OTHER PUBLICATIONS

Notification Concerning Submission, Obtention or Transmittal of Priority Document for International Application No. PCT/IB2018/050460 dated Mar. 23, 2018.
International Search Report and Written Opinion for International Application No. PCT/IB2018/050460 dated May 11, 2018.
Office Action and Search Report (with translation) for Chinese Application No. 201880000093.4 dated May 24, 2021 (16 pages).
Office Action for European Patent Application No. 18 704 601.6 dated May 3, 2022 (6 pages).

* cited by examiner

TRACKED VEHICLE AND FLEET OF TRACKED VEHICLES

PRIORITY CLAIM

This application is a national stage application of PCT/IB2018/050460, filed on Jan. 25, 2018, which claims the benefit of and priority to Italian Patent Application No. 102017000007911, filed on Jan. 25, 2017, the entire contents of which are each incorporated by reference herein.

TECHNICAL FIELD

The disclosure relates to a tracked vehicle, for example for the preparation of ski slopes, and to a fleet of said tracked vehicles.

In particular, the disclosure relates to a tracked vehicle comprising a first and a second track; a mechanical power generator assembly; an assembly of operating devices coupled to the generator assembly; a first and a second drive wheel coupled to the first and to the second track, respectively, and to the generator assembly; a starting key; and starting lock; the starting lock being coupled to the mechanical power generator assembly so as to start the mechanical power generator assembly.

BACKGROUND

Generally speaking, a tracked vehicle comprises a control cabin, which houses an operator driving the vehicle. The control cabin comprises a door, which has a door lock, which can be opened with a door key and/or with a remote control.

Certain drawbacks of certain of the prior art lies in the fact that the operator of the tracked vehicle needs two keys, one to open the door and one to start the tracked vehicle.

SUMMARY

An object of the disclosure is to provide a tracked vehicle which reduces certain of the drawbacks of certain of the prior art.

According to the disclosure, a tracked vehicle is provided, which comprises a first and a second track, a mechanical power generator assembly; an assembly of operating devices coupled to the generator assembly; a first and a second drive wheel coupled to the first and to the second track, respectively, and to the generator assembly; an interface to receive inputs; and a control unit coupled to the interface to receive inputs; the control unit being coupled to the mechanical power generator assembly and being configured to enable or disable starting of the mechanical power generator assembly based on inputs received by the interface.

It should be appreciated that in accordance with the disclosure, the operator can start the mechanical power generator assembly by an input entered through the interface and without the use of a key, in a relatively easy and relatively economic fashion. Furthermore, the tracked vehicle can be started with different inputs and, consequently, by different operators and can associate operating parameters of the tracked vehicle with the operator using the tracked vehicle.

According to one embodiment, the interface is a user interface and comprises a keyboard and/or a keypad and/or a fingerprint sensor for entering the inputs; such as, the inputs can be defined by a number sequence and/or a fingerprint and/or data of a fingerprint.

According to another embodiment, the interface is a transceiver interface and is configured to receive the inputs through radio signals; such as, the inputs sent through radio signals can be defined by a number sequence and/or a fingerprint and/or data of a fingerprint.

According to certain embodiments, the control unit comprises a memory in which there is stored at least one enabling input; the control unit being configured to compare the inputs with said at least one enabling input stored and, in case the inputs correspond to said at least one enabling input, to enable starting of the mechanical power generator assembly.

According to certain embodiments, the tracked vehicle comprises a cabin configured to accommodate the operator of the tracked vehicle; the cabin having a door comprising a door lock that is configured to be opened with a key or with a remote control.

According to certain embodiments, the interface comprises a start command connected to the control unit to start the mechanical power generator assembly; the control unit being configured to start the mechanical power generator assembly when the control unit receives the start command and the starting of the generator assembly is enabled.

According to certain embodiments, the interface comprises a touch screen display coupled to the control unit and through which it receives the inputs from the operator.

According to certain embodiments, the tracked vehicle comprises a selector and a display coupled to the control unit to receive the inputs to be sent to the control unit and to be viewed on the display, such as the selector being selected in a group comprising a wheel selector; a joystick selector; a touch pad on an armrest of the vehicle.

According to certain embodiments, the memory comprises a plurality of enabling inputs; the control unit is configured to compare the inputs with the plurality of enabling inputs and to enable the starting of the tracked vehicle if the inputs correspond to one of the enabling inputs of the plurality of enabling inputs.

According to certain embodiments, each enabling input is associated with an enabling level; the control unit being configured to enable one or more operating devices based on the enabling level associated with the enabling input entered.

According to certain embodiments, the control unit is configured to store the enabling input entered and to couple the entered enabling unit with at least one operating parameter of the tracked vehicle detected during the use of the tracked vehicle so as to monitor the type of use of the tracked vehicle associated with the enabling input entered; such as, said at least one operating parameter is selected among vehicle speed; drive wheel speed; winch speed, winch jib angle, position of command levers, vehicle weight, operating hours, fuel level, total fuel consumption, position, engine temperature, oil temperature, coolant temperature.

According to certain embodiments, the control unit is configured to set, upon starting of the tracked vehicle, setting parameters of the tracked vehicle coupled with the input entered by the operator; such as, the setting parameters are selected among: control parameters of devices housed in the cabin; control parameters of the vehicle; control parameters of the operating devices.

According to certain embodiments, the vehicle comprises a radio data transceiver unit to transmit the enabling input entered and said at least operating parameter to a remote processing unit.

Another object of the disclosure is to provide a management system of a tracked vehicle which reduces certain of the drawbacks of certain of the prior art.

According to the disclosure, a management system of a tracked vehicle is provided, which comprises the tracked vehicle disclosed herein and a remote processing unit coupled to the radio transceiver unit to receive data transmitted by the radio transceiver unit; the remote processing unit comprising a display unit to display data of the tracked vehicle.

Another object of the disclosure is to provide a fleet of tracked vehicles which reduces certain of the drawbacks of certain of the prior art.

According to the disclosure, a fleet of tracked vehicles is provided, which comprises a plurality of the tracked vehicles disclosed herein; wherein the control unit of each tracked vehicle comprises a memory in which there is stored at least one enabling input; and wherein the enabling inputs of the memories of the respective tracked vehicles are the same as one another.

According to certain embodiments, the control unit of each tracked vehicle comprises a memory in which there are stored a plurality of enabling inputs; and at least one of the plurality of enabling inputs of the memories of the respective tracked vehicles is the same as the others.

The management system of a fleet of tracked vehicles comprises the fleet of the tracked vehicle disclosed herein and a remote processing unit coupled to the radio transceiver unit to receive data transmitted by the radio transceiver unit; the remote processing unit comprising a display unit to display data of the fleet of tracked vehicles.

Additional features are described in, and will be apparent from the following Detailed Description and the figures.

BRIEF DESCRIPTION OF THE DRAWINGS

Other features and advantages of the disclosure will be best understood upon perusal of the following description of a non-limiting embodiment thereof, with reference to the accompanying drawing, wherein.

DETAILED DESCRIPTION

Figure 1:
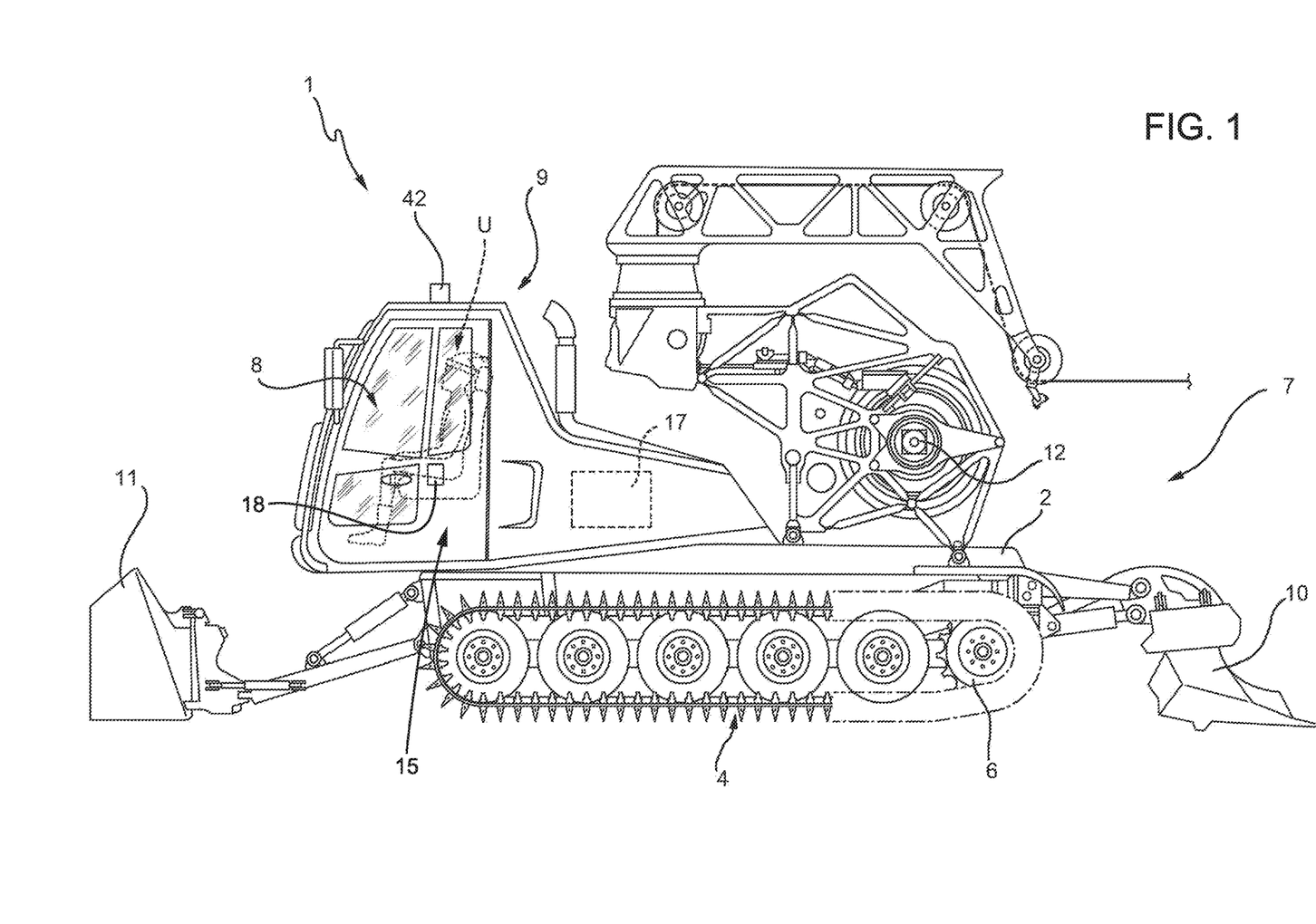
FIG. 1 is a side elevation view, with parts removed for greater clarity, of a tracked vehicle according to the disclosure.

Referring now to the example embodiments of the present disclosure illustrated in FIGS. 1 to 4 and with reference to FIG. 1, number 1 defines, as a whole, a tracked vehicle for the preparation of ski slopes. The tracked vehicle 1 comprises a frame 2; a first track 3 (FIG. 2); a second track 4; a first drive wheel 5 (FIG. 2) and a second drive wheel 6, which are independent of one another and are coupled to the first track 3 (FIG. 2) and to the second track 4, respectively; a group of operating devices 7; a control unit 17; an interface 8, which can be operated by a user U and is coupled to the control unit 17 so as to send inputs IN from the operator U to the control unit 17; and a driver's cabin 9.

The interface 8 can be a user interface arranged on the tracked vehicle 1 or the interface can be a transceiver interface to receive the inputs IN via radio.

In another embodiment, the interface is a transceiver interface and is configured to receive in inputs IN via radio.

The inputs IN sent via radio or entered through the user interface can be defined by a number sequence and/or a fingerprint or data concerning a fingerprint.

The cabin 9 is configured to accommodate the operator U of the tracked vehicle 1 and comprises a door 15 comprising a door lock 18, which is configured to be opened or closed with a door key and/or with a remote control.

Figure 2:
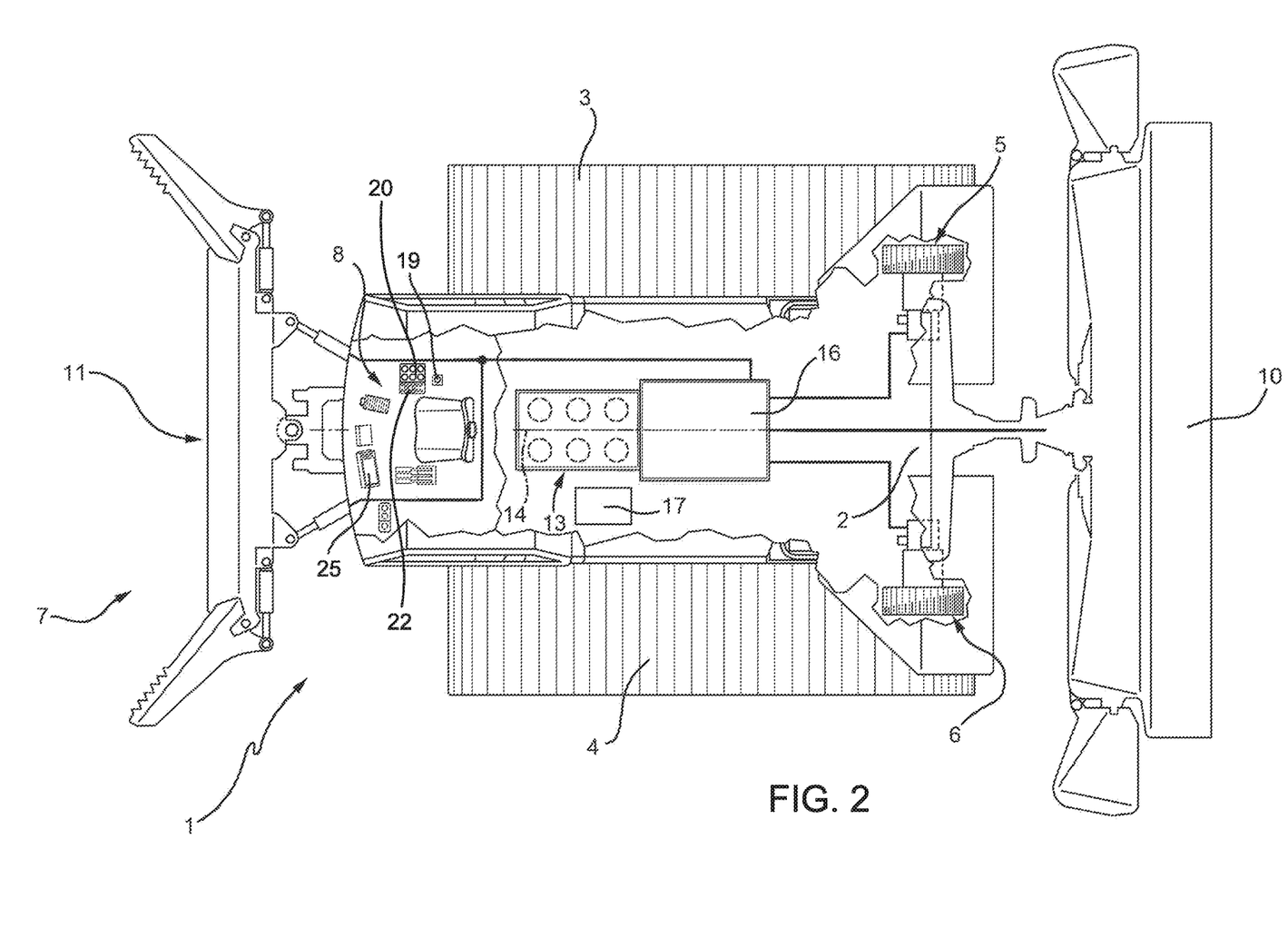
FIG. 2 is a view from the top, with parts removed for greater clarity, of the tracked vehicle of FIG. 1.

In the case in point and with reference to FIG. 2, the group of operating devices 7 (FIG. 1) comprises a mill 10; a shovel 11; and a winch 12 (FIG. 1).

The first drive wheel 5, the second drive wheel 6 and the operating devices 7 define a group of utilities.

With reference to FIG. 2, the tracked vehicle 1 comprises a mechanical power generator assembly 13, which, in the example shown herein, is an internal combustion engine 13 having a drive shaft 14 (which is schematically shown); a power transmission 16, which is operatively connected to the drive shaft 14 and is configured to connect the internal combustion engine 13 to the group of operating devices 7 (FIG. 1), to the first drive wheel 5 and to the second drive wheel 6. The control unit 17 is coupled to the generator assembly 13 and to the power transmission 16 so as to control the generator assembly 13 and the power transmission 16, respectively.

In an alternative version of the disclosure (which is not shown in the accompanying drawings), the mechanical power generator assembly comprises an electric motor, which replaces the internal combustion engine or cooperates with and is coupled to the internal combustion engine, thus forming a hybrid system.

The power transmission 16 is a power transmission comprising mechanical and/or hydraulic and/or electric elements. For example, the power transmission 16 can comprise a mechanical transmission, hydraulic pumps, hydraulic ducts, hydraulic actuators, mechanical gears, shafts, electric generators and electric motors.

More in detail and in a non-limiting embodiment of the disclosure, the power transmission 16 comprises at least one electric generator, which is mechanically coupled to the mechanical power generator assembly; and at least electric actuator, such as an electric motor, which is operatively coupled to one of the operating devices and is electrically coupled to the electric generator.

In a non-limiting embodiment of the disclosure, the power transmission comprises at least one hydraulic pump, which is mechanically coupled to the internal combustion engine; and at least one hydraulic actuator, which is operatively coupled to one of the operating devices and is hydraulically coupled to the hydraulic pump.

The interface 8 is configured to receive the inputs IN from the operator U.

The control unit 17 is coupled to the user interface 8 so as to receive the inputs IN from the operator U through the user interface 8.

The control unit 17 is coupled to the mechanical power generator assembly 13 and is configured to start or turn off the mechanical power generator assembly 13.

Figure 3:
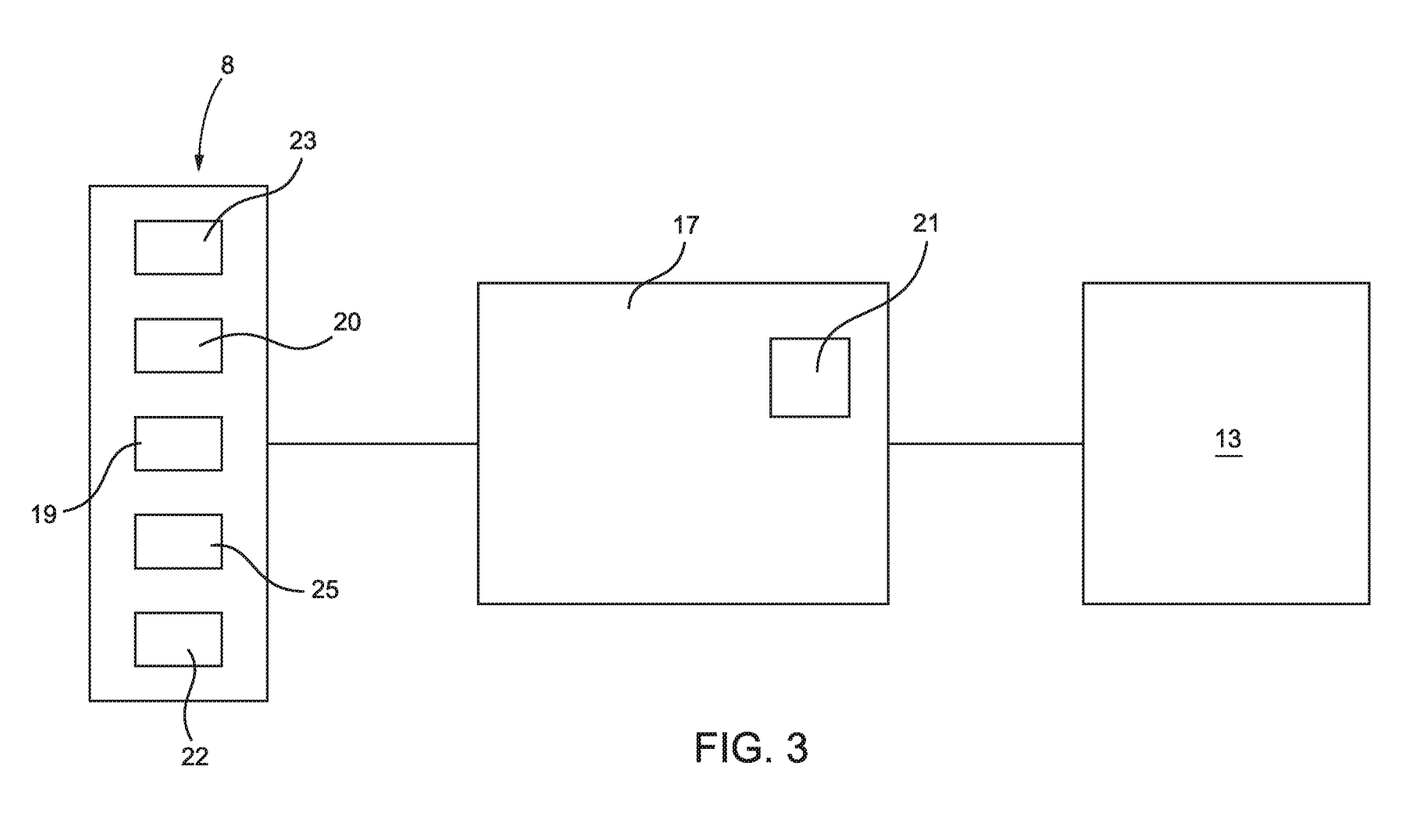
FIG. 3 is a block diagram of a detail of the tracked vehicle of FIG. 1.

The user interface 8 comprises a keyboard and/or a keypad 20 to receive inputs from the user U and send them to the control unit 17 in order to enter letter sequences, number sequences or any combination thereof. In another embodiment, the user interface 8 comprises a fingerprint sensor 23 to enter the inputs IN as fingerprints. In another embodiment, the user interface 8 comprises both the keypad 20 and the fingerprint sensor 23 and the inputs are a combination of fingerprints and numeric or alphanumeric sequences.

The user interface 8 comprises a start command 19, for example a start button, which is connected to the control unit 17 so as to start the mechanical power generator assembly 13.

The user interface 8 comprises a display 25 to show the inputs of the operator U and a state of the tracked vehicle 1.

In an alternative embodiment, the user interface comprises a touch screen display coupled to the control unit and through which the user interface receives the inputs from the operator.

In an alternative embodiment, the user interface comprises a selector and a display, which are coupled to the control unit so as to receive the inputs to be sent to the control unit and to be displayed on the display. The selector is a wheel selector and/or a joystick.

Furthermore, the control unit 17 comprises a memory 21 where a plurality of enabling inputs are stored. Each enabling input is a set of numeric characters. In another embodiment, the enabling input is a set of alphanumeric characters. In another embodiment, the enabling input is a set of letters of an alphabet.

Furthermore, the control unit 17 is configured to define a state of the tracked vehicle 1, which, for example, is stored in the memory 21. The state of the tracked vehicle 1 can be: enabled starting or disabled starting.

The control unit 17 is configured to compare the inputs IN entered by the operator U with the enabling inputs and, if the inputs IN correspond to one of the enabling inputs, change the state of the tracked vehicle 1 from disabled starting to enabled starting.

In certain non-limiting embodiments of the disclosure, each enabling input of the plurality of enabling inputs is associated with an enabling level. In use, the control unit 17 is configured to enable the use of one or more operating devices 7 based on the enabling level associated with the enabling input entered by the operator U.

Furthermore, the control unit 17 is associated with the start command 19 so as to receive a starting signal. The control unit 17 is configured to start the tracked vehicle 1 and, in particular, the mechanical power generator assembly 13, when the control unit receives the starting command and the state of the tracked vehicle is enabled starting. In other words, the starting command causes the starting of the tracked vehicle 1 only if the state of the tracked vehicle 1 corresponds to enabled starting, whereas the starting command does not cause the starting of the tracked vehicle 1 if the state of the tracked vehicle corresponds to disabled starting.

The control unit 17 is configured to store the enabling input entered in the memory 17 and to compare at least one of the operating parameters of the tracked vehicle 1 detected during the use of the tracked vehicle with said enabling input entered, so as to monitor the type of use of the tracked vehicle of the user with which said enabling input entered is associated. The operating parameters are: a speed of the tracked vehicle 1; a speed of the first drive wheel 5 and/or of the second drive wheel 6, a speed of the winch 12, jib angle of the winch 12, position of control levers, weight of the vehicles, operating hours, fuel level, total fuel consumption, position, engine temperature, oil temperature, coolant temperature, error signals. As a consequence, the control unit 17 creates a storing file in which there are stored one or more operating parameters of the tracked vehicle 1 and the enabling input entered, thus being able to track down the operator U who used the tracked vehicle 1 and how the tracked vehicle 1 was used. This information can be used for analyzing the use of the tracked vehicle 1 and for possible analyses of damages to the tracked vehicle 1.

Furthermore, the control unit is configured to set, upon starting of the tracked vehicle, setting parameters of the tracked vehicle coupled with the input entered by the operator; such as, the setting parameters are selected among: control parameters of devices housed in the cabin; control parameters of the vehicle; control parameters of the operating devices 7.

In more detail, the control parameters of the devices present in the cabin comprise one or more of the following elements: setting of the windshield wipers, for example on, off, continuous, discontinuous, movement time interval; setting of the heating (i.e., on, off, time of activation of the heating cycle); setting of the user interface, for example brightness of the screen, brightness of the selector 22, brightness of the keypad 20, metric units or imperial units (British units), visibility of the speedometer; video camera parameter (i.e., on or off; operating parameters of the radio system).

The control parameters of the tracked vehicle comprise one or more of the following elements: parameters concerning the steering unit (i.e. setting parameters, reserve); parameters concerning the features of the accelerator pedal; management of the generator assembly 13 (i.e., type of control, maximum engine speed); parameters concerning the driver assistance system (i.e., sensitivity to the movement of the control levers in drive, neutral and rear position), automatic activation of the service brake (i.e., activation delay).

The control parameters of the operating devices 7 comprise one or more of the following elements: control parameters of the front operating device 7, in particular of the shovel 11, in more detail type of control features of the control device, for example joystick; control parameters of the rear operating device 7, in particular of the mill 10, in more detail type of control, automatic operation of the mill lifting, automatic operating of the mill lowering, mill anti-stall system; control parameters of the winch, in more detail operating mode of the winch: automatic, manual, features of the winch.

In an alternative embodiment, the tracked vehicle 1 comprises a transceiver device to transmit the enabling input and at least one of the operating parameters of the tracked vehicle 1 to a control center.

Figure 4:
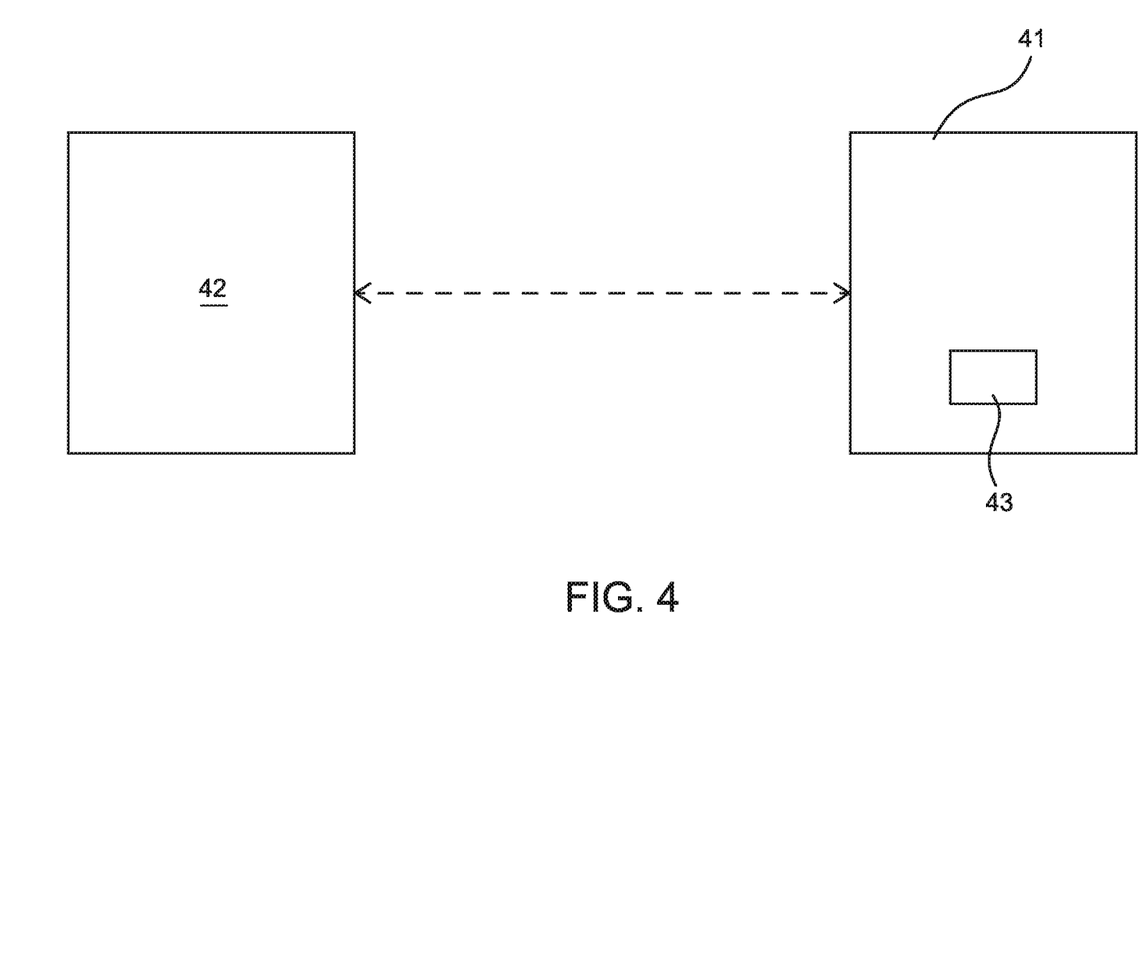
FIG. 4 is a block diagram of a detail of a management system of the tracked vehicle of FIG. 1.

The tracked vehicle 1 further comprises a radio data transceiver unit 42 to transmit the enabling input entered and said at least operating parameter to a remote processing unit 41.

The disclosure also relates to a management system of a tracked vehicle comprising the tracked vehicle 1 and a remote processing unit 41, which is coupled to the radio transceiver unit 42 so as to receive the data transmitted by the radio transceiver unit 42; the remote processing unit 41 comprising a display unit 43 to display the data of the tracked vehicle 1.

The disclosure further relates to a fleet of tracked vehicles 1 comprising a plurality of tracked vehicles 1 of the type described above. One or more enabling inputs entered in the memory 21 of one of the tracked vehicles 1 can be the same as one or more enabling inputs entered in the memory 21 of one or more or all tracked vehicles 1 of the fleet of tracked vehicles 1. In this way, each operator U can access one or more or all tracked vehicles of the fleet of tracked vehicles 1 with the same enabling input. Furthermore, based on this disclosure, someone can enter, in the memory 21 of the control units 17 of all tracked vehicles 1, a same enabling input that is the same in all tracked vehicles, so that mechanics can use it the start the tracked vehicle and carry out maintenance works on the tracked vehicles. In other words, in use, the operator U opens the door of the cabin 9 with the door key or with the remote control and then enters an input through the interface 8. The control unit 17 compares the input entered with the enabling inputs stored in the memory 21 and, if the input entered corresponds to one of the enabling inputs stored, then the control unit enables the starting of the mechanical power generator assembly 13. The operator U receive a successful enabling message through the display and presses the start command. The control unit 17 receives the signal from the start command and starts the mechanical power generator assembly 13; as a consequence, the operator U can use the tracked vehicle 1. During the use, the control unit 17 stores at least one of the operating parameters and associates them with the enabling input entered. When the operator U wants to turn off the mechanical power generator assembly 13, the operator uses the start command again. The control unit 17 receives the signal from the start command and turn off the mechanical power generator assembly 13. The operator U can leave the cabin 9 and close the door 15 of the cabin 9 using the door key or the remote control.

In an alternative embodiment, the operator U enters the input IN through the interface 8, which is in communication with a mobile transceiver device, for example a mobile phone or a remote control. The communication between the mobile transceiver device and the interface can be of the type using Bluetooth, Wan or a mobile cellular network.

The inputs can consist of a numeric sequence to be entered in the mobile phone or of a fingerprint detected by the mobile transceiver device.

It should thus be appreciated that the tracked vehicle 1 can be turned on without the use of a dedicated key. Furthermore, the tracked vehicle 1 can be used by different operators U and can store, through the operating parameters of the tracked vehicle 1, the use of the tracked vehicle 1 made by each operator U. Finally, the operation of the tracked vehicle 1 can be limited to some functions or to all functions, based on the experience of the user U, through the use of the enabling levels associated with each enabling input.

Furthermore, it is evident the disclosure also covers embodiments that are not described in the detailed description above as well as equivalent embodiments that are part of the scope of protection set forth in the appended claims. As such, the present disclosure also covers embodiments not described in the detailed description and equivalent embodiments that fall within scope of the appended claims. Accordingly, various changes and modifications to the presently disclosed embodiments will be apparent to those skilled in the art.

The invention claimed is:

1. A tracked vehicle of a fleet of a plurality of track vehicles, the tracked vehicle comprising:
   a first track;
   a second track;
   a mechanical power generator assembly;
   an assembly of operating devices coupled to the mechanical power generator assembly;
   a first drive wheel coupled to the first track and to the mechanical power generator assembly;
   a second drive wheel coupled to the second track and to the mechanical power generator assembly;
   an interface configured to receive an input; and
   a control unit coupled to the interface and to the mechanical power generator assembly, the control unit comprises a memory that stores a plurality of enabling inputs that are each associated with an enabling level, wherein independent of any operator of any of the plurality of tracked vehicles of the fleet, at least one of the plurality of enabling inputs is the same for each of the plurality of tracked vehicles of the fleet and the control unit is configured to:
   compare the received input with the plurality of enabling inputs,
   responsive to the received input corresponding to a first enabling input of the plurality of enabling inputs:
     enable a starting of the mechanical power generator assembly,
     enable, based on a first enabling level of the first enabling input, use of at least one of the operating devices of the assembly of operating devices,
     store the first enabling input,
     detect, during use of the tracked vehicle, at least one operating parameter comprising at least one of: a speed of the tracked vehicle, a drive wheel speed, a winch speed, a winch jib angle, a position of command levers, a tracked vehicle weight, operating hours, a fuel level, a total fuel consumption, a position, an engine temperature, an oil temperature, a coolant temperature, and an error signal, and
     create a file which couples the first enabling input with the at least one operating parameter of the tracked vehicle to enable an analysis, in association with an operator that inputted the first enabling input, of at least one of the use of the tracked vehicle, and any damage to the tracked vehicle,
   responsive to the received input corresponding to a second, different enabling input of the plurality of enabling inputs:
     enable the starting of the mechanical power generator assembly, and
     not enable, based on a second, different enabling level of the second, different enabling input, any use of the at least one of the operating devices of the assembly of operating devices, and
   responsive to the received input not being any of the plurality of enabling inputs, disable the starting of the mechanical power generator assembly.

2. The tracked vehicle of claim 1, wherein the interface comprises a user interface comprising at least one of: a keyboard, a keypad, and a fingerprint sensor.

3. The tracked vehicle of claim 2, wherein the input comprises at least one of: a number sequence, a fingerprint, and data associated with the fingerprint.

4. The tracked vehicle of claim 1, wherein the interface comprises a transceiver interface configured to receive the input through a radio signal.

5. The tracked vehicle of claim 4, wherein the input received through the radio signal comprises at least one of: a number sequence, a fingerprint, and data associated with the fingerprint.

6. The tracked vehicle of claim 1, further comprising a cab configured to accommodate the operator, the cab having a door comprising a door lock that is configured to operate with at least one of: a key and a remote control.

7. The tracked vehicle of claim 1, wherein the interface comprises a start command associated with the starting of the mechanical power generator assembly, and the control unit is configured to start the mechanical power generator assembly when the control unit receives data associated with the start command and the starting of the mechanical power generator assembly is enabled.

8. The tracked vehicle of claim 1, wherein the interface comprises a touch screen display coupled to the control unit and through which the interface receives the input from the operator.

9. The tracked vehicle of claim 1, further comprising a selector and a display coupled to the control unit and configured to receive the input.

10. The tracked vehicle of claim 9, wherein the selector comprises at least one of: a wheel selector, a joystick selector, and a touch pad on an armrest of the tracked vehicle.

11. The tracked vehicle of claim 1, further comprising a data transceiver unit configured to transmit to a remote processing unit the enabling input coupled with the at least one operating parameter.

12. The tracked vehicle of claim 1, wherein the control unit is configured to set at least one tracked vehicle setting parameter when the tracked vehicle is started, the at least one tracked vehicle setting parameter being defined by the received input.

13. The tracked vehicle of claim 12, wherein the at least one tracked vehicle setting parameter comprises at least one of: a control parameter of a device housed in a cabin, a control parameter of the tracked vehicle and a control parameter of a work device.

14. A management system of a fleet of tracked vehicles, the management system comprising:
a plurality of tracked vehicles, each tracked vehicle comprising:
a first track;
a second track;
a mechanical power generator assembly;
an assembly of operating devices coupled to the mechanical power generator assembly;
a first drive wheel coupled to the first track and to the mechanical power generator assembly;
a second drive wheel coupled to the second track and to the mechanical power generator assembly;
an interface configured to receive an input;
a control unit coupled to the interface and to the mechanical power generator assembly, the control unit comprises a memory that stores a plurality of enabling inputs that are each associated with an enabling level, wherein independent of any operator of any of the plurality of tracked vehicles, at least one of the plurality of enabling inputs is the same for each of the plurality of tracked vehicles and the control unit is configured to:
compare the received input with the plurality of enabling inputs,
responsive to the received input corresponding to a first enabling input of the plurality of enabling inputs:
enable a starting of the mechanical power generator assembly, and
couple, based on a first enabling level of the first enabling input, the enabling input with at least one operating parameter of the tracked vehicle detected during use of the tracked vehicle, the at least one operating parameter of the tracked vehicle comprises at least one of: a speed of the tracked vehicle, a drive wheel speed, a winch speed, a winch jib angle, a position of command levers, a tracked vehicle weight, operating hours, a fuel level, a total fuel consumption, a position, an engine temperature, an oil temperature, a coolant temperature, and an error signal, and
responsive to the received input corresponding to a second, different enabling input of the plurality of enabling inputs:
enable the starting of the mechanical power generator assembly, and
not couple, based on a second, different enabling level of the second, different enabling input, the at least one operating parameter of the tracked vehicle detected during use of the tracked vehicle, and
responsive to the received input not being any of the plurality of enabling inputs, disable the starting of the mechanical power generator assembly; and
a data transceiver unit configured to transmit data associated with any received enabling input and the at least one coupled operating parameter; and
a remote processing unit comprising a display unit configured to display data of the tracked vehicle, the remote processing unit configured to receive the data transmitted by the data transceiver unit.

15. The management system of claim 14, wherein the plurality of enabling inputs are the same for each of the plurality of tracked vehicles.

16. A fleet of tracked vehicles comprising:
a plurality of tracked vehicles, each tracked vehicle comprising
a first track;
a second track;
a mechanical power generator assembly;
an assembly of operating devices coupled to the mechanical power generator assembly;
a first drive wheel coupled to the first track and to the mechanical power generator assembly;
a second drive wheel coupled to the second track and to the mechanical power generator assembly;
an interface configured to receive an input; and
a control unit coupled to the interface and to the mechanical power generator assembly, the control unit comprising a memory that stores a plurality of enabling inputs that are each associated with an enabling level, and independent of any operator of any of the plurality of tracked vehicles, at least one of the plurality of enabling inputs is the same for each of the plurality of tracked vehicles, wherein the control unit is configured to:
compare the received input with the plurality of enabling inputs,
responsive to the received input corresponding to a first enabling input of the plurality of enabling inputs:
enable a starting of the mechanical power generator assembly,
enable, based on a first enabling level of the first enabling input, use of at least one of the operating devices of the assembly of operating devices,
store the first enabling input,
detect, during use of the tracked vehicle, at least one operating parameter comprising at least one of: a speed of the tracked vehicle, a drive wheel speed, a winch speed, a winch jib angle, a position of command levers, a tracked vehicle weight, operating hours, a fuel level, a total fuel consumption, a position, an engine temperature, an oil temperature, a coolant temperature, and an error signal, and create a file which couples the first enabling input with the at least one operating parameter of the tracked vehicle to enable an analysis, in association with an operator that inputted the first enabling input, of at least one of the use of the tracked vehicle, and any damage to the tracked vehicle, responsive to the received input corresponding to a second, different enabling input of the plurality of enabling inputs:

enable the starting of the mechanical power generator assembly, and not enable, based on a second, different enabling level of the second, different enabling input, any use of the at least one of the operating devices of the assembly of operating devices, and responsive to the received input not being any of the plurality of enabling inputs, disable the starting of the mechanical power generator assembly.

17. The fleet of claim 16, wherein the plurality of enabling inputs are the same for each of the plurality of tracked vehicles.

18. A fleet of tracked vehicles comprising:

a plurality of tracked vehicles, each tracked vehicle comprising:

a first track;

a second track;

a mechanical power generator assembly;

an assembly of operating devices coupled to the mechanical power generator assembly;

a first drive wheel coupled to the first track and to the mechanical power generator assembly;

a second drive wheel coupled to the second track and to the mechanical power generator assembly;

an interface configured to receive an input; and a control unit coupled to the interface and to the mechanical power generator assembly and comprising a memory that stores a plurality of enabling inputs, wherein each of the plurality of enabling inputs are associated with an enabling level, independent of any operator of any of the plurality of tracked vehicles, at least one of the plurality of enabling inputs is the same for each of the plurality of tracked vehicles and the control unit is configured to:

set at least one tracked vehicle setting parameter when the tracked vehicle is started, the at least one tracked vehicle setting parameter being defined by the received input and comprising at least one of: a control parameter of a device housed in a cabin, a control parameter of the tracked vehicle and a control parameter of a work device, compare the received input with the plurality of enabling inputs, responsive to the received input corresponding to a first enabling input of the plurality of enabling inputs:

enable a starting of the mechanical power generator assembly, and enable, based on a first enabling level of the first enabling input, use of at least one of the operating devices of the assembly of operating devices, responsive to the received input corresponding to a second, different enabling input of the plurality of enabling inputs:

enable the starting of the mechanical power generator assembly, and not enable, based on a second, different enabling level of the second, different enabling input, any use of the at least one of the operating devices of the assembly of operating devices, and responsive to the received input not being any of the plurality of enabling inputs, disable the starting of the mechanical power generator assembly.

19. The fleet of claim 18, wherein the plurality of enabling inputs are the same for each of the plurality of tracked vehicles.

20. A management system of a fleet of tracked vehicles, the management system comprising:

a plurality of tracked vehicles, each tracked vehicle comprising a first track;

a second track;

a mechanical power generator assembly;

an assembly of operating devices coupled to the mechanical power generator assembly;

a first drive wheel coupled to the first track and to the mechanical power generator assembly;

a second drive wheel coupled to the second track and to the mechanical power generator assembly;

an interface configured to receive an input;

a control unit coupled to the interface and to the mechanical power generator assembly, the control unit comprising a memory that stores a plurality of enabling inputs that are each associated with an enabling level and independent of any operator of any of the plurality of tracked vehicles, at least one of the plurality of enabling inputs is the same for each of the plurality of tracked vehicles, wherein the control unit is configured to:

set at least one tracked vehicle setting parameter when the tracked vehicle is started, the at least one tracked vehicle setting parameter being defined by the received input and comprising at least one of: a control parameter of a device housed in a cabin, a control parameter of the tracked vehicle and a control parameter of a work device, compare the received input with the plurality of enabling inputs, responsive to the received input corresponding to a first enabling input of the plurality of enabling inputs:

enable a starting of the mechanical power generator assembly, and enable, based on a first enabling level of the first enabling input, use of at least one of the operating devices of the assembly of operating devices, responsive to the received input corresponding to a second, different enabling input of the plurality of enabling inputs:

enable the starting of the mechanical power generator assembly, and not enable, based on a second, different enabling level of the second, different enabling input, any use of the at least one of the operating devices of the assembly of operating devices, and responsive to the received input not being any of the plurality of enabling inputs, disable the starting of the mechanical power generator assembly; and a data transceiver unit configured to transmit data associated with that tracked vehicle; and a remote processing unit configured to receive the data transmitted by the data transceiver units of the tracked vehicles, the remote processing unit comprising a display unit configured to display data associated with the plurality of tracked vehicles.

21. The management system of claim 20, wherein the plurality of enabling inputs are the same for each of the plurality of tracked vehicles.

\* \* \* \* \*